Jan. 28, 1941.   J. H. GOSS   2,229,969
ENCLOSED BALL BEARING
Filed Sept. 30, 1938
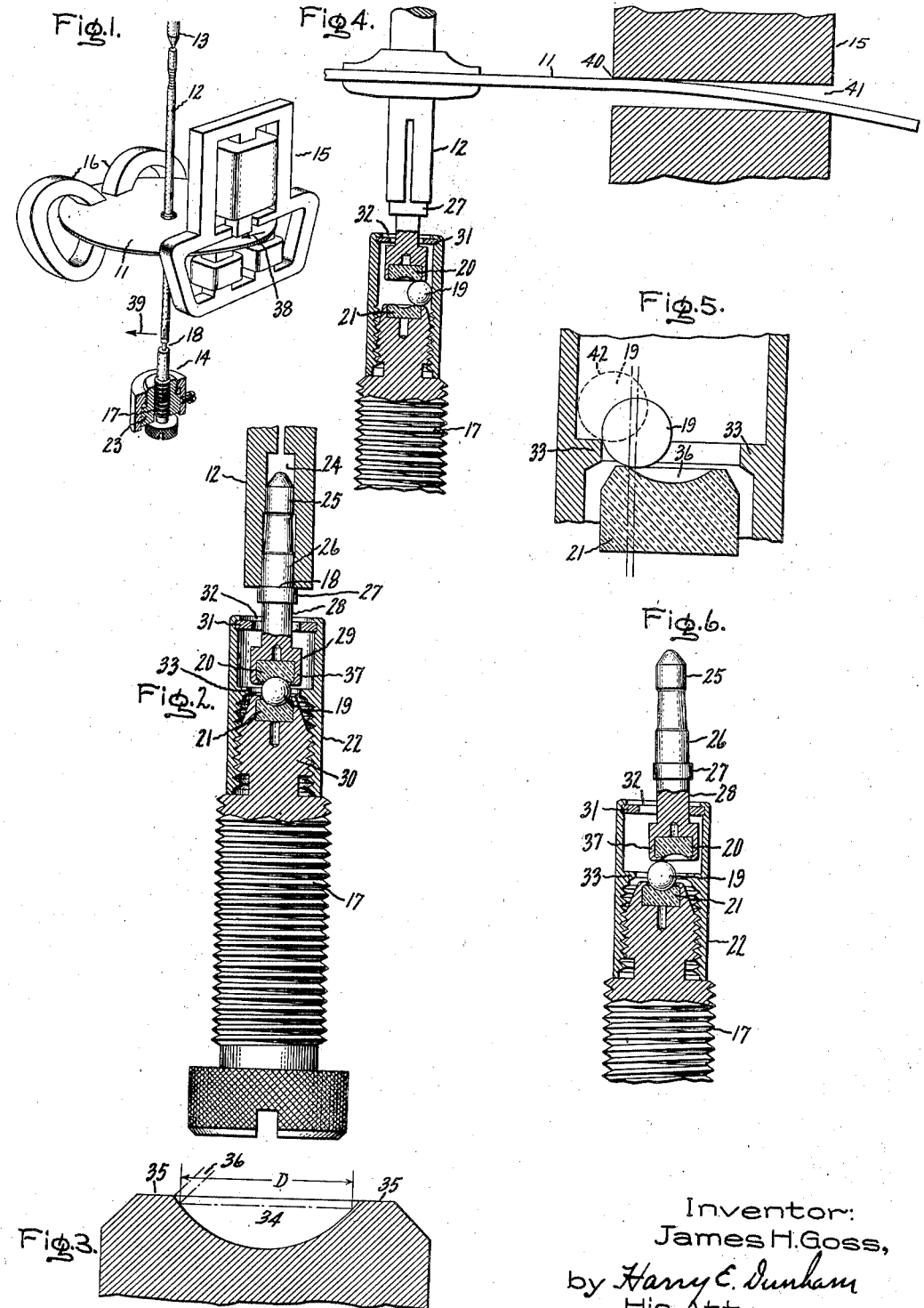
Inventor:
James H. Goss,
by Harry E. Dunham
His Attorney.

Patented Jan. 28, 1941

2,229,969

UNITED STATES PATENT OFFICE 2,229,969

ENCLOSED BALL BEARING

James H. Goss, Swampscott, Mass., assignor to General Electric Company, a corporation of New York Application September 30, 1938, Serial No. 232,595

7 Claims. (Cl. 308—159)

My invention relates to ball bearings and concerns particularly ball bearing assemblies for rotating disk integrating meters such as watthour meters.

It is an object of my invention to provide a low friction bearing capable of taking both end and side thrust and adapted to restrain the motion of the meter shaft sufficiently to avoid clearance difficulty in the air gap.

Another object of my invention is to provide a ball bearing which is very nearly enclosed and provides substantial protection against entrance of dust particles and other foreign matters to the bearing.

It is a further object of my invention to provide an improved jewel bearing of the type having a hardened ball resting between the two cupped jewels which rotate relatively to each other.

Still another object of my invention is to provide a bearing assembly which as a whole may readily be replaced for the purpose of renewing the parts which are most subject to wear and which is so constructed that the ball and rotating jewel are retained in the bearing when the bearing assembly is replaced, so as to avoid the dangers of losing parts, permitting dirt to enter the bearing or of permitting the parts to become damaged after they have been checked.

Furthermore, it is an object of my invention to provide a ball bearing construction in which the possibility of the ball getting out of place and the rotating mechanism being jammed is overcome.

It is also an object of my invention to provide a bearing construction overcoming noise and vibration.

Other and further objects and advantages will become apparent as the description proceeds.

In carrying out my invention in its preferred form in connection with a vertical spindle rotating disk watthour meter I utilize a spindle having its lower end hollow for a short distance to receive a spindle extension or pivot which serves as a mounting for a rotatable cupped jewel, and I provide a jewel screw having the upper end in the form of a plug for receiving a stationary cupped jewel. A ball is provided which rests between the cupped portions of the upper and lower or rotatable and stationary jewels. There is provided also a sleeve, which is threaded onto the plug portion of the jewel screw. The sleeve surrounds both of the cupped jewels and has a retaining ring surrounding the neck portion of the spindle extension or jewel mounting so that the ball bearing is very nearly enclosed.

Further details of the construction will be given in the following detailed description from which the invention will be understood more readily when considered in connection with the accompanying drawing, and those features of the invention which are believed to be novel and patentable will be pointed out in the claims appended hereto. In the drawing Figure 1 is a perspective diagram of the operating mechanism of a watthour meter provided with a lower bearing which is constructed in accordance with my invention. Figure 2 is an elevation, partly in cross section of a ball bearing assembly such as that shown in Figure 1. Figure 3 is a fragmentary view of a central vertical section cut through the lower or stationary cupped jewel shown in Figure 2. Figure 4 is a detailed fragmentary view of a watthour meter and lower bearing, with the lower bearing of the jewel and ball type but not embodying all the features of my invention, this figure being presented to illustrate one of the problems encountered in watthour meter operation which is overcome by my invention. Figure 5 is a detailed fragmentary view of a central vertical section of the portion of the apparatus in the vicinity of the ball showing the features which retain the ball in a proper position in the cup in the jewel, and Figure 6 is a fragmentary view in elevation, partially in section showing how loss of parts is prevented in my construction.

Like reference characters are utilized throughout the drawing to designate like parts.

Referring more in detail to the drawing, I have illustrated in Figure 1 a watthour meter with the register mechanism and its supporting base omitted for the sake of clarity but showing a rotatable disk 11 carried by a vertical spindle 12 supported between the upper pivot 13 and the lower ball bearing 14. A field structure 15 of the well-known type comprising a core carrying potential and current windings is provided for producing a shifting magnetic field which reacts upon the disk 11 to apply a tangential force to the disk 11 and cause rotation thereof. There is also a pair of braking magnets 16 which operate in the manner well known in the art for producing a restraining torque on the disk 11 to make the speed thereof proportional to the torque exerted by the field structure 15.

The ball bearing assembly serving as the lower bearing 14 of the apparatus (see Fig. 2) includes a jewel screw 17, a spindle extension 18, a ball 19, which may be composed of hardened steel, a pair of cupped jewels 20 and 21, with their cupped portions against the surface of the ball 19, the jewels being mounted within the spindle extension 18 and the jewel screw 17, respectively, and a sleeve 22 which is secured to the jewel screw 17 and surrounds and nearly encloses the ball 19 and the cupped jewels 20 and 21. The jewel screw 17 is threaded into a suitable member 23 which is carried by a bracket on the meter base, not shown. The lower end of spindle 12 has a concentric hole 24 drilled therein to receive the spindle extension 18, and the spindle 12 is preferably bifurcated in order to provide a spring grip for the upper or stem portion 25—26 of the spindle extension 18. The spindle extension 18 is provided with a collar 27 which seats against the lower extremity of the spindle 12 to fix the position of the spindle extension 18 in the spindle 12. For taking side thrust as a journal and still imposing a minimum of frictional restraining torque, a relatively narrow neck portion 28 is formed in the spindle extension 18 below the collar 27. At the lower end of the spindle extension 18 an end portion 29 of enlarged diameter is formed with an opening, within which the cupped jewel 20 is set with the cupped portion downward and exposed. It will be understood that the edges of the portion 29 are bent over to secure the jewel 20 in place, or the jewel 20 is otherwise suitably set rigidly in the portion 29. The jewel screw 17 has at its upper end a plug portion 30 at the top of which there is an opening in which the jewel 21 is set with the cupped portion upward and exposed. It will be understood that the jewel 21 is likewise set rigidly in some suitable manner as by bending over the material of the plug portion 30 around the edge of the opening for receiving the jewel 21.

The plug portion 30 of the jewel screw 17 is threaded to receive threads formed on the inside of the lower portion of the sleeve 22 whereby the sleeve 22 is secured to the jewel screw 17 and a closed joint is formed between the sleeve 22 and the jewel screw 17. In order to make the ball bearing very nearly enclosed a retaining ring 31 is provided at the upper end of the sleeve 22 with an opening slightly larger than the neck portion 28 of the spindle extension 18. In order to prevent the spindle extension 18 and the ball 19 from dropping out of the sleeve 22 when the jewel screw is removed from the member 12, the opening 32 in the sleeve 31 is made smaller than the diameter of the end portion 29 of the spindle extension. In order to provide a durable side thrust surface cooperating with the neck portion 28 of the spindle extension 18 and in order to overcome noise and vibration the retaining ring 31 is made of some suitable tough vibration-absorbing sound deadening substance having a high value of internal friction or what might be called solid viscosity as defined by Bedford Patent 2,092,632. For example, I may employ a resin impregnated fibre consisting of a laminated fabric impregnated with a binder composed of a phenolic condensation product such as the fibrous material sold under the trade name "Textolite."

For the purpose of insuring that the ball 19 will drop into its proper position in the cupped portion of the jewel 20 a shoulder 33 is provided in the inside of the sleeve 22 intermediate the ends thereof between the positions normally occupied by the jewels 20 and 21 and substantially surrounding the ball 19. The width of the shoulder 33 or the difference between the internal and external radii of the shoulder is made such in relation to the radius of the ball 19 that the ball will drop off the shoulder 33 on to the jewel 21, and the relationship between the diameters of the cupped portion of the jewel 21, and the internal diameter of the shoulder 33 is likewise made such that ball 19 will drop into the cupped portion of the jewel 21. To this and the difference between the internal diameter and the external diameter of the shoulder 33 is made less than the diameter of the ball 19. The external diameter of the shoulder 33 is the internal diameter of the portion of the sleeve 22 between the shoulder 33 and the retaining ring 31. In the construction shown the difference between the diameter of the neck portion 28 of the jewel mounting 18 and the opening 32 in the retaining ring 31 is less than the diameter of the cupped portion of either of the jewels 20 and 21 so that the ball cannot ride out of the cupped portion of either jewel when the spindle neck 28 moves against the inner edge of the retaining ring 31. However, I have found that it is not actually necessary to keep the last-mentioned dimensions within the limits indicated for the reason that in practice the ball 19 tends to ride up in the cupped portions of both jewels when the spindle 12 is running eccentrically with the jewel screw 17. The difference in diameter of the opening 32 in the retaining ring 31 and the neck portion 28 of the jewel mounting 18 is made less than the difference between the internal diameter of the sleeve 22 and the diameter of the end portion 29 of the jewel mounting 18 so that even if the spindle leg 28 rides against the retaining ring 31 there will be no contact between the end portion 29 of the jewel mounting 18 and the inside surface of the sleeve 22.

It will be apparent to those skilled in the art that the successful practice of my invention is not limited to any specific dimensions or ratios of dimensions. However, as an aid in setting forth relationships which I have found to lead to successful constructions, I shall mention certain specific dimensions and tolerances which I have used in one embodiment of my invention. For example, the ball 19 may be approximately .062" in diameter, and the jewels 20 and 21 may be sapphire jewels (Fig. 3) of a commercially available type having outside diameters from .090 to .095" with spherical cupped portions 34, the radii of which are from .045 to .055". It does not appear to be commercially feasible to insist upon jewels being machined with cups that are accurately spherical up to the top flat surface 35 of the jewel. With jewels obtained from some sources the portion of the jewel cup within the dimension lines 36, shown in Figure 3, is conical and in jewels obtained from other sources this portion is reversely curved to give a rounded edge to the jewel cup. I have used jewels with a non-spherical portion having a maximum width of .003" measured between the dimension lines 36 or a maximum depth of .002" measured vertically from the flat face 35 of the jewel to the beginning of the actual spherical portion of the cup 34. The depth of the spherical portion 36 may be from .013 to .016". When such a jewel is set in the rotatable or upper jewel mounting 18 the wall thickness of the portion 37 (Fig. 2) of the mounting surrounding the jewel may be from .005" to .015". With a jewel having a spherical portion 34 with a radius .050" and a depth thereof of .013", the diameter D of the spherical portion of the cup is thus approximately .067". The neck portion 28 of the jewel mounting or spindle extension 18 in the illustrated construction referred to is .070" with a tolerance of plus or minus one-thousandth, and the diameter of the opening 32 in the retaining ring 31 is .102" with a tolerance of plus or minus one-thousandth. However, with a ball and with jewels of the size specified, I have found that the opening 32 in the retaining ring 31 may be made from .045" to .109", and the diameter of the neck portion 28 of the spindle extension 18 may be from .037 to .085" in a construction which is practicable from engineering and manufacturing standpoints.

The method of operation of the jewel assembly and the need for both end thrust and side thrust bearing surfaces will be apparent from a consideration of the method of operation of induction disk devices such as watthour meters. Under ordinary circumstances the principal loading of the bearing is the thrust load, borne by the ball and the jewel cup surfaces, due to the weight of the rotatable element including the disk 11 and the spindle 12. However, the meter operates by reason of the fact that the field structure 15 tends to drive the portion of the disk 11 within the air gap of the meter 15 in a tangential direction (represented by the arrow 38), and the restraining force of the drag magnet 16 also acts in a tangential direction so that there is a tendency to produce translation or sidewise movement of the spindle 12 to cause the lower end thereof to move sidewise in the direction of the arrow 39 assuming the force of the field structure 15 to be in the direction of the arrow 38. Thus there is a tendency for the side thrust on the spindle extension to drive the neck portion 28 against one of the edges of the retaining ring 31. As long as this side thrust remains moderate it is taken up by diagonal reaction between the cupped surfaces of the jewel and the surfaces of the ball 19. The side thrust, however, causes the spindle 12 to travel upward as the ball 19 tends to ride up the spherical surfaces of the jewels 20 and 21. In order to prevent the spindle 12 from traveling upward too far or from causing the disk 11 to rub on the edges of the air gap in the field 15, and in order to prevent the jewels from moving sidewise beyond the position at which the end thrust may be taken between the smooth surface of the jewels and the ball, the side thrust bearing surfaces between the neck portion 28 and the retaining ring 31 are provided. In the case of heavy overloads or short circuits this side thrust may become very great.

Furthermore, due to certain electrical and magnetic characteristics of the watthour meter which need not be discussed here, alternating forces of double frequency, that is of the frequency of 120 cycles in the case of ordinary 60 cycle watthour meters, may arise which tend to drive the disk out of the air gap in the field 15, and such forces result in a more or less continuous tendency of the rotating parts to vibrate. As long as the meter shaft is not restrained in any way, and if the design is proper, this tendency to vibrate is relatively small and entirely unobjectionable. However, if any stationary part comes in contact with the meter shaft, the effect of the minute vibration is to deliver a succession of sharp blows to the moving system. As the moving system is quite resonant, these blows cause the disk to vibrate in the well known manner at a fairly high frequency and the result would be a very noticeable noise if means were not provided for compensating for this effect. Action of this type occurs when the load has increased to the point where the travel of the disk is limited by the retaining ring 31. However, since the retaining ring 31 is composed of a material which offers relatively little friction on the neck portion 28 of the spindle 18 and tends to absorb or damp out vibrations, my construction eliminates the problem of vibration and noise of the type mentioned. Since any tendency of the moving system to vibrate results in rapid lateral motion of the bearing surfaces and ensuing wear, my construction, by overcoming noise and vibration, also minimizes wear. Nevertheless, oil or other lubricant is not needed.

A problem which arises in connection with meters of the type illustrated in Figure 1 is that the spindle 12 may be caused to move upward axially due to a blow, a short circuit, or a strain in shipment and in bearing assemblies of the type shown in Fig. 4, it is possible for the ball to come out of the jewel cup and to go between the two flat surfaces of the jewel mountings as illustrated in Figure 4. If the meter is so adjusted, as is often the case, that this action occurs at approximately the same time that the disk 11 hits the top surface 40 of the air gap 41 in the field structure 15, there is sufficient spring in the disk to lock the ball in position so that the meter is left with the disk 11 pressed tightly against the magnet 15, as shown in Figure 4. In this condition, of course, the meter is inoperative.

Such locking of the ball 19 is overcome in my construction by the shoulder 33. As illustrated in Figure 5, if the upper jewel 20 should move upward as far as to permit the ball 19 to approach the position shown in dotted lines 42, it will not be possible for the ball 19 to lodge in this position since the width of the shoulder 33 is less than the radius of the ball and causes the ball to drop down upon the lower jewel 21. Then when the ball reaches the position shown in full lines in Figure 5 the distance from the inner edge of the shoulder 33 to the outer edge of the cup portion 36 of the jewel 21 is also less than the radius of the ball 19 and the ball drops from the position shown in full to the center of the cup 36. It will be understood that the ball 19 never actually rides upward as far as the position shown in full in Figure 5 during the normal operation of the meter when the jewel 21 is rotating, owing to the relationship between the diameter of the cupped portion of the jewels and the clearance between the neck portion 28 of the spindle extension 18 and the opening 32 in the retaining ring 31. For the same reason the ball will remain within the cupped portion of the upper jewel 20 so long as the two jewels are pressed together by the weight of the disk carried by spindle 12 and the spindle 12 is straight and parallel to the axis of the jewel screw 17. In addition to preventing the locking of the ball 19 between the edges of the jewel mountings during operation of a complete watthour meter, the shoulder 33 serves a purpose of great value during the assembly of the bearing. If the shoulder 33 were not present when the bearing was originally assembled, and if the sleeve 22 were made so short as to prevent the ball 19 from riding into the position shown in Figure 4 after completion of the assembly, there would be considerable danger that the ball 19 might take the position shown in Figure 4 before the sleeve 22 had been screwed down. Then, with the ball locked in this position, either the ball or the jewels 20 and 21 would be crushed by the great force capable of being exerted while the sleeve 22 was being screwed down to its proper position. Obviously, the sleeve 22 is opaque and the bearing assembler would have no way of ascertaining whether or not the ball 19 had dropped into its proper position in the cup 36 of the jewel 21 before he screwed down the sleeve 22. When the sleeve is used having the shoulder 33, however, the ball 19 drops into its proper position. Even, in case the screw is held horizontally during assembly, the ball 19 is pushed into the proper position and would not become jammed between the outer edges of the jewels while the sleeve 22 is being screwed down to assemble the complete bearing.

Inasmuch as watthour meters frequently make millions of revolutions before they are replaced it will be apparent that it may be necessary during the life of the watthour meter to renew parts of the bearing which are most subject to wear. These may be the ball and the jewel surfaces. If this should become necessary the entire bearing assembly is removed by unscrewing the jewel screw 17 and drawing it downward which causes the stem end 24—25 of the spindle extension 18 to be pulled out of the lower end of spindle 12 since the retaining ring 31 holds the large diameter end portion 29 of the spindle 18 within the chamber in the sleeve 22. The entire bearing assembly contained within the screw of the jewel screw 17 is replaced by a new one in order that there will be no danger of losing any of the parts of the bearing assembly and it will not be possible for dirt to enter the bearing or for the parts to be damaged mechanically or contaminated by grease or perspiration on the hands of the central station employee servicing the watthour meters. It will be understood, of course, that the assembly may be repaired or parts of it may be replaced at the laboratory or factory by unscrewing the sleeve 22 and slipping it off over the stem end 25—26 of the spindle extension 18. This, however, is not done by the meter servicing employee and after the replaced bearing assembly has been checked in the laboratory or factory the bearing remains assembled as shown in Figure 2 and is inserted in the meter in this form.

As shown in Figure 6 when the jewel screw 17 is removed from the meter, even though the spindle extension 18 is free to move around and the jewels may be separated somewhat and permit the ball to move, it is impossible for either the ball 19 or the upper jewel mounting 18 to become lost since the clearance between the neck portion 28 and the opening 32 in the retaining ring is too small. Owing to this relatively small clearance the ball bearing is substantially enclosed and there is very little tendency during either operation of the meters or during storage of the ball bearing assemblies for dirt or foreign matter to enter.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. An enclosed end thrust ball bearing comprising first and second relatively movable jewel mountings containing first and second cupped jewels, respectively, a ball cooperating with said first and second jewels to form a bearing and a sleeve closely secured to the first of said mountings and surrounding both of said jewel mountings, the second mounting having adjacent the end thereof a substantially cylindrical neck portion and at the end thereof a substantially cylindrical portion of greater diameter within which the said second jewel is set with the cupped portion exposed at the end of said mounting, the first jewel being likewise set within the end portion of said first mounting with the cupped portion exposed at the end of the mounting, said ball normally resting within and between said jewel cupped portions, said sleeve containing at one end secured therein, a retaining ring surrounding the said mounting neck portion said retaining ring being composed of resin impregnated fibrous material and having such a diameter as to take up side thrust and prevent rubbing between the second of said jewel mountings and said sleeve.

2. A combination end thrust and side thrust bearing comprising a stationary jewel mounting containing a cupped jewel, a rotatable jewel mounting containing a second cupped jewel, a ball cooperating with the said jewels to form an end thrust bearing and a sleeve secured to said stationary mounting and surrounding said rotatable jewel mounting, said rotatable mounting having adjacent the end thereof a substantially cylindrical neck portion, said second jewel being set in the end portion of said mounting with the cupped portion exposed at the end of said mounting, the first jewel being likewise set within the end portion of said stationary mounting with the cupped portion exposed at the end of the mounting, said ball normally resting within and between said jewel cupped portions, said sleeve containing at one end, secured therein, a retaining ring surrounding the neck portion of said rotatable mounting and being composed of a fibrous vibration absorbing material.

3. A bearing for vertical-axis induction disk meters comprising a stationary jewel mounting containing a cupped jewel, a rotatable jewel mounting containing a second cupped jewel, a ball cooperating with the said jewels to form an end thrust bearing and a sleeve secured to said stationary mounting and surrounding both said jewel mountings, said mountings having ends extending toward each other within which said jewels are mounted, the cupped portions exposed and extending toward each other, said ball normally resting within and between said jewel cupped portions, said sleeve having an intermediate portion thereof, an internal shoulder with a surface substantially perpendicular to the axis of the sleeve, the difference between the internal and external diameters of the shoulder in the sleeve and the difference between said internal diameter and the diameter of the cupped portion of the stationary jewel being less than the diameter of the said ball whereby locking of the ball outside of positions within the cupped portions of the jewels is prevented, said shoulder being lower than the lower end of the rotatable jewel mounting for preventing interference therewith.

4. A bearing for induction disk meters comprising a stationary jewel mounting containing a cupped jewel, a rotatable jewel mounting containing a second cupped jewel, a ball cooperating with the said jewels to form an end thrust bearing and a sleeve closely secured to said stationary mounting and surrounding both said jewel mountings, said rotatable mounting having adjacent the end thereof a substantially cylindrical neck portion and at the end thereof a substantially cylindrical portion of greater diameter within which the said second jewel is set with the cupped portion exposed at the end of said mounting, the first jewel being likewise set within the end portion of said stationary mounting with the cupped portion exposed at the end of the mounting, said ball normally resting within and between said jewel cupped portions, said sleeve containing at one end secured therein, a retaining ring surrounding the neck portion of said rotatable mounting, the internal diameter of the portion of said sleeve surrounding said rotatable mounting being greater than the diameter of the end portion of said rotatable mounting, the retaining ring having a circular opening greater in diameter than the neck portion of said rotatable mounting but less in diameter than the end portion of said rotatable mounting whereby removability of said mounting through said opening and loss of said ball are prevented.

5. A bearing comprising a pair of relatively rotatable jewel mountings, each containing a cupped jewel in the end thereof, a ball cooperating with said jewels to form an end thrust bearing, and a sleeve secured to one of said mountings and closely surrounding both of said mountings, the second mounting having adjacent the end thereof a substantially cylindrical neck portion, said mountings being end to end with the cupped portions of the jewels exposed toward each other, said ball normally resting within and between said jewel cupped portions, said sleeve containing at one end secured therein, a retaining ring surrounding the said mounting neck portion, the difference in diameter between the neck and end portion of said rotatable mounting being less than the difference in diameter between the opening in the retaining ring and the internal portion of the sleeve whereby side thrust is taken up by the neck portion of the mounting riding against the retaining sleeve and friction between the larger diameter end portion of the mounting and the sleeve is avoided.

6. An enclosed end thrust ball bearing comprising first and second relatively movable jewel mountings containing first and second cupped jewels, respectively, a ball cooperating with said jewels to form a bearing and a sleeve secured to the first of said mountings and surrounding both of said jewel mountings, the second mounting having said second jewel set therein with the cupped portion exposed at the end of said mounting, and having a substantially cylindrical portion for side thrust, the first jewel being likewise set within the end portion of said first mounting with the cupped portion exposed at the end of the mounting, said ball normally resting within and between said jewel cupped portions, said sleeve having an inner bearing surface in alignment with and adapted to take up side thrust from the said cylindrical portion of the second mounting and composed of fibrous vibration absorbing material.

7. A combination end thrust and side thrust bearing comprising stationary and rotatable members on a common axis with relatively low friction end portions projecting toward one another to take up end thrust and serve as an end thrust bearing, the rotatable member having a cylindrical side surface forming a journal for side thrust and the stationary member having a sleeve member extending around said cylindrical side surface, said sleeve member having an inner side thrust bearing surface aligned with the journal surface of the rotatable member and comprising a fibrous vibration absorbing material whereby shock, vibration and noise of side thrust is taken up.

JAMES H. GOSS.